Patented Aug. 31, 1954

2,688,009

UNITED STATES PATENT OFFICE 2,688,009

SOLID REACTION PRODUCT OF A LIQUID POLYMERIZED DIENE AND METHOD OF MAKING THE SAME

Willie W. Crouch, Bartlesville, Okla., and Ted F. Crosnoe, Borger, Tex., assignors to Phillips Petroleum Company, a corporation of Delaware No Drawing. Application January 2, 1951, Serial No. 204,071

8 Claims. (Cl. 260—47)

This invention relates to a process for the preparation of novel solid products from liquid polymers and copolymers. In certain of its specific aspects the invention pertains to thermosetting solids, and the thermoset materials resulting from the heating of same.

We have now discovered a process for the preparation of solid materials from liquid polymers of conjugated dienes or from liquid copolymers of conjugated dienes and compounds copolymerizable therewith. According to our process a liquid polymer or copolymer for example liquid polybutadiene, is admixed with about 5 weight per cent or more of an organic compound containing two vinyl groups of sufficient activity to react with said liquid polymer or copolymer. The mixture is then heated in the presence of a small amount of catalyst. Solidification is usually effected in a period of about 2.5 to 6 hours at a temperature of 70 to 150° F. By further heating, a firm solid somewhat resinous material is formed. This is quite surprising because it has previously been reported that use of more than 0.5 per cent of divinylbenzene in the polymerization of diolefins to form synthetic rubber causes a tremendous decrease in tensile strength such as to render the resulting polymer worthless for use as rubber. In fact, samples in which 1 per cent divinylbenzene had been used were too weak to be removed from a curing mold in one piece.

The products of the present invention are useful as potting materials for electrical equipment of many kinds, for example transformers, and their short solidification periods are advantageous for the mass production of said potted equipment. It is a further advantage of the present materials that they are thermosetting and remain solid at elevated temperatures. Thus if used in applications where they are subjected to heat, said heat may be advantageously employed to solidify our materials in situ.

The divinyl reactants of the present invention comprise compounds of the following general formula

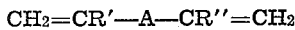

wherein A represents a substituted or unsubstituted arylene radical such as phenylene, methyl phenylene, naphthylene, or diphenylene, or a pyridylene radical

or sulfur, or oxygen, and each R can be hydrogen, a methyl group or an ethyl group. Examples of such compounds include the isomeric divinylbenzenes, di-(α-methyl vinyl) benzenes, divinylpyridines, divinylnaphthalenes, divinyl sulfide, divinyl ether and others. Any of the above compounds singly or in combination, can be used within the range stated herein. Broadly stated these reactants can be any compound containing two vinyl groups of sufficient activity to undergo reaction with the liquid polymer or copolymer.

The amount of divinyl compound employed to interact with the liquid polymer or copolymer is in the range of 5 to 50 parts by weight per 100 parts of liquid polymer or copolymer, preferably 15 to 40 parts per 100 parts of liquid polymer or copolymer.

The temperatures at which our process is applicable are usually in the range from 40 to 400° F. The solidification period will depend upon the temperature employed and will usually be from 2 to 8 hours when operating in a convenient temperature range of say 70 to 250° F. When operating at lower temperatures, say from 70 down to 40° F., the solidification time will be increased and in some cases may require as long as a week. When operating at the higher temperatures, i. e. above 250° F. the solidification period will be much shortened. "Solidification period" includes both the time required for an initial solidification and the total time required for what can be termed final hardening wherein, if desired, a thermoset resin-like material is formed. Those skilled in the art will appreciate that choice of degree of heating and time of heating will be made in accordance with the properties desired in the solid product.

The polymeric starting materials of the present process are liquid materials having viscosities in the range from 100 to 5,000, preferably 400 to 3,000, Saybolt furol seconds at 100° F. These materials can be obtained from any suitable source and can be prepared by methods known to the art. A suitable method for the preparation of liquid polybutadiene free from dissolved solids comprises the sodium catalyzed polymerization of butadiene as described in copending application Serial No. 67,098, filed December 23, 1948, by W. W. Crouch, now U. S. 2,631,175, the disclosure of which is hereby incorporated by reference.

The liquid starting materials of the present invention include liquid polymers of conjugated dienes such as the conjugated butadienes, e. g. butadiene (1,3-butadiene), 2,3-dimethyl-1,3-butadiene, isoprene, piperylene, 3-furyl-1,3-butadiene, 3-methoxy-1,3-butadiene, and the like, or liquid copolymers of conjugated dienes with monomers copolymerizable therewith. Said copolymers shall contain at least 25 per cent by weight of the conjugated diene and shall have a minimum unsaturation value equivalent to one ethylenic linkage per 16 carbon atoms. Suitable monomeric materials which can be copolymerized with the conjugated dienes include unsaturated organic compounds which generally contain the characteristic group $CH_2=C<$ and, in most cases, have at least one of the disconnected valences attached to an electro-negative group, that is, a group which increases the polar character of the molecule such as chlorine group or an organic group containing a double or triple bond such as vinyl, phenyl, cyano, carboxy or the like. Included in this class of monomers are isobutylene and propylene; the haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, and derivatives thereof, of the type described.

Catalysts applicable to the present invention should be soluble in or miscible with the liquid polymer or copolymer and of the free radical former type. We have usually preferred to employ the hydroperoxymethanes such as isopropylbenzene hydroperoxide, tert-butylisopropylbenzene hydroperoxide, di-tert-butylisopropylbenzene hydroperoxide and the like with or without a polyalkylene polyamine such as triethylenetetramine, tetraethylenepentamine and the like. Other hydroperoxides and hydroperoxide-amine catalyst-activator compositions are fully described in copending application Serial No. 133,466, filed December 16, 1949, by W. B. Reynolds et al., now U. S. 2,638,464. Catalyst-initiator systems such as the diazo thio-ethers disclosed in U. S. Patent 2,501,692 by W. B. Reynolds et al., or the organic hydroperoxide-carbamate systems disclosed in copending application Serial No. 183,304, filed September 5, 1950, by Uraneck et al., now U. S. 2,629,709, are also applicable. Catalyst systems such as the diazo amino aryl compounds and the aliphatic diazo compounds which are well known in the art can also be employed in the present process. The quantity of catalyst will depend to a great extent on the particular catalyst chosen and the particular reactants involved, and will ordinarily be within the range of 0.05 to 1.0 weight per cent based on the liquid polymer reactant; from 0.1 to 0.5 per cent is usually satisfactory.

In using our materials, various solids, for example inert fillers in finely divided form, can be incorporated either prior to the initial solid-forming reaction, or subsequent to such initial reaction but prior to final heating which sets the product. Examples of fillers, dyes, and the like which it may be desired to incorporate will readily occur to those skilled in the art. For instance, powdered gillsonite, clays, wood flour, and many other fillers can be used, due regard being given to the use intended for the final product.

The following data are presented as exemplary with respect to materials used, process conditions employed, and products obtained.

*Example I*

Liquid polybutadiene was prepared by charging butadiene to a closed reactor containing n-heptane as diluent and finely dispersed sodium as catalyst. Approximately ⅙ of the butadiene was charged initially and the remainder charged at a constant rate to maintain a temperature of 200 to 206° F. and a pressure of about 10 p. s. i. g. The process was operated to build up a concentration of 40 per cent polymer in the diluent in 3 hours. The amount of catalyst based upon the total butadiene was 1.25 weight per cent. After the polymerization was stopped the catalyst was removed by extraction of the reaction product with sulfuric acid, isopropanol and water.

This material had the following physical properties:

Refractive index @ 20° C_____ 1.5200
Viscosity, SFS @ 100° F_____ 435
Specific gravity 60/60° F_____ 0.9097

Liquid polybutadiene so prepared was used in the runs reported in the following examples.

*Example II*

A series of runs was made in which liquid polybutadiene was solidified by reacting it with divinylbenzene. These runs were all made by heating measured quantities of liquid polybutadiene, divinylbenzene and a catalyst in 25 x 100 mm. test tubes in a constant temperature oil bath at 140±2° F. The recipes used and the quantities of materials employed are presented in the following table.

[Temperature, 140° F.]

| Weight, Grams | | | | Time, hours to solid |
|---|---|---|---|---|
| Poly-butadiene | Divinyl-benzene | Diox 7* | Tetraethylene pentamine | |
| 15 | 5 | 0.2 | 0.05 | 3 |
| 15 | 5 | 0.2 | 0.1 | 2.5 |
| 15 | 5 | 0.2 | 0.15 | 3 |

*A trade-mark for tert-butylisopropylbenzene hydroperoxide.

All of the products had set to gelatinous solids at the end of the heating period.

*Example III*

A run was made wherein a mixture of 15 grams of polybutadiene, 5 grams of divinylbenzene, and 0.2 grams of tert-butylisopropylbenzene hydroperoxide was heated at 250° F. for 24 hours. The product obtained by this procedure had set to a firm solid having completely lost its gelatinous nature.

We claim:

1. A solid reaction product produced by reacting, in the presence of a polymerization catalyst, reactants consisting of a liquid polymer of a conjugated diene produced by mass polymerization with a sodium catalyst, having a viscosity in the range from 100 to 5000 Saybolt furol seconds at 100° F., with from 5 to 50 weight per cent, based on said polymer of a conjugated diene, of a compound having the formula $$CH_2=CR'-A-CR''=CH_2$$

wherein A is selected from the group consisting of an arylene radical, pyridylene radical, sulfur and oxygen, and each R is selected from the group consisting of hydrogen, methyl and ethyl.

2. A solid reaction product produced by reacting, in the presence of a polymerization catalyst, reactants consisting of a liquid polybutadiene produced by mass polymerization with a sodium catalyst, having a viscosity in the range from 100 to 5000 Saybolt furol seconds at 100° F., with from 5 to 50 weight per cent, based on said polybutadiene, of divinylbenzene.

3. A thermosetting material comprising a gelatinous solid produced by heating together, in the presence of a polymerization catalyst, reactants consisting of 5 to 50 parts of divinylbenzene with 100 parts of a liquid polybutadiene produced by mass polymerization with a sodium catalyst, and having a viscosity in the range from 100 to 5000 Saybolt furol seconds at 100° F., for a time insufficient to effect complete setting and solidification thereof.

4. A process which comprises subjecting a mixture consisting of, as reactants, (a) a liquid polymer of a conjugated diene produced by mass polymerization with a sodium catalyst having a viscosity in the range from 100 to 5000 Saybolt furol seconds at 100° F., (b) from 5 to 50 parts by weight, per 100 parts of said liquid polymer of a conjugated diene, of a divinyl compound reactive therewith and having the formula $$CH_2=CR'-A-CR''=CH_2$$

wherein A is selected from the group consisting of an arylene radical, pyridylene radical, sulfur and oxygen, and each R is selected from the group consisting of hydrogen, methyl and ethyl, and (c) a hydroperoxymethane catalyst, to heating at a temperature and for a time at least sufficient to cause an initial gelation of the mixture to solid form.

5. A process which comprises reacting ingredients consisting of a compound having the formula $CH_2=CR'-A-CR''=CH_2$ wherein A is selected from the group consisting of an arylene radical, pyridylene radical, sulfur and oxygen, and each R is selected from the group consisting of hydrogen, methyl and ethyl, with a liquid viscous polymer of butadiene produced by mass polymerization with a sodium catalyst, having a viscosity in the range of 100 to 5000 Saybolt furol seconds at 100° F., in the presence of a hydroperoxymethane catalyst at a temperature within the range of 40 to 400° F. for a time sufficient to solidify the reaction mixture, the reactants being employed in the ratio of 5 to 50 parts by weight of said compound per 100 parts of said polymer of butadiene.

6. A process which comprises reacting ingredients consisting of a compound having the formula $CH_2=CR'-A-CR''=CH_2$ wherein A is selected from the group consisting of an arylene radical, pyridylene radical, sulfur and oxygen, and each R is selected from the group consisting of hydrogen, methyl and ethyl, with a liquid viscous copolymer of butadiene and an organic compound containing a $CH=C<$ group which is copolymerizable therewith, and produced by mass polymerization with a sodium catalyst, said copolymer containing at least 25 per cent by weight of combined butadiene, and said copolymer having a minimum unsaturation value equivalent to one ethylenic linkage per 16 carbon atoms, and having a viscosity in the range of 100 to 5000 Saybolt furol seconds at 100° F., in the presence of from 0.1 to 0.5 weight per cent, based on said copolymer, of a catalyst comprising a hydroperoxymethane, at a temperature and for a time sufficient to solidify the reaction mixture, the reactants being employed in the ratio of 5 to 50 parts by weight of said compound having the formula $CH_2=CR'-A-CR''=CH_2$ per 100 parts of said copolymer.

7. A method for solidifying a solids-free liquid polybutadiene, having the viscosity within the range of 400 to 3000 Saybolt furol seconds at 100° F. prepared by mass sodium catalyzed polymerization of 1,3-butadiene, which comprises reacting said liquid polybutadiene with from 15 to 40 weight per cent, based on said polybutadiene, of a reactant consisting of a divinyl compound reactive therewith and having the formula $CH_2=CR'-A-CR''=CH_2$ wherein A is selected from the group consisting of an arylene radical, pyridylene radical, sulfur and oxygen, and each R is selected from the group consisting of hydrogen, methyl and ethyl, in the presence of a polymerization catalyst to form a solid reaction product.

8. A method according to claim 6 wherein the catalyst is tertiarybutylisopropylbenzene hydroperoxide and tetraethylenepentamine.

References Cited in the file of this patent
UNITED STATES PATENTS

| Number | Name | Date |
|---|---|---|
| 1,938,730 | Tschunkur | Dec. 12, 1933 |
| 2,383,084 | Rummelsburg | Aug. 21, 1945 |
| 2,474,807 | Schoene | July 5, 1949 |
| 2,527,640 | Lorand et al. | Oct. 31, 1950 |
| 2,597,951 | Romeyn et al. | May 27, 1952 |

FOREIGN PATENTS

| Number | Country | Date |
|---|---|---|
| 593,072 | Great Britain | Oct. 8, 1947 |

OTHER REFERENCES

Whitby et al., Rubber Age, vol. 65, p. 545, Aug. 1947.